United States Patent [19]

Austin

[11] Patent Number: 4,807,083
[45] Date of Patent: Feb. 21, 1989

[54] SURGE SUPPRESSOR FOR COAX CABLE AND AC POWER LINES

[75] Inventor: Kirk Austin, San Rafael, Calif.

[73] Assignee: Panamax, Inc., San Rafael, Calif.

[21] Appl. No.: 25,263

[22] Filed: Mar. 12, 1987

[51] Int. Cl.[4] .............................................. H02H 9/04
[52] U.S. Cl. .................................... 361/111; 361/104; 361/118
[58] Field of Search .................... 361/89, 91, 104, 111, 361/117, 118

[56] References Cited

U.S. PATENT DOCUMENTS

| | | | |
|---|---|---|---|
| 3,369,153 | 2/1968 | Arnold et al. | 361/118 |
| 4,023,071 | 5/1977 | Fussell | 361/111 |
| 4,089,032 | 5/1978 | Dell Orfano | 361/111 |
| 4,210,906 | 7/1980 | Smith et al. | 340/659 |
| 4,500,862 | 2/1985 | Shedd | 361/118 |
| 4,630,163 | 12/1986 | Cooper et al. | 361/56 |
| 4,698,721 | 10/1987 | Warren | 361/111 |

*Primary Examiner*—A. D. Pellinen
*Assistant Examiner*—Jeffrey A. Gaffin
*Attorney, Agent, or Firm*—Limbach, Limbach & Sutton

[57] ABSTRACT

A voltage surge suppressing apparatus for connecting electronic equipment to AC power and coaxial antenna lines. The surge suppressing apparatus includes two surge suppression circuits, one for the coaxial antenna line and other for the AC power line, both mounted within a single housing.

12 Claims, 2 Drawing Sheets

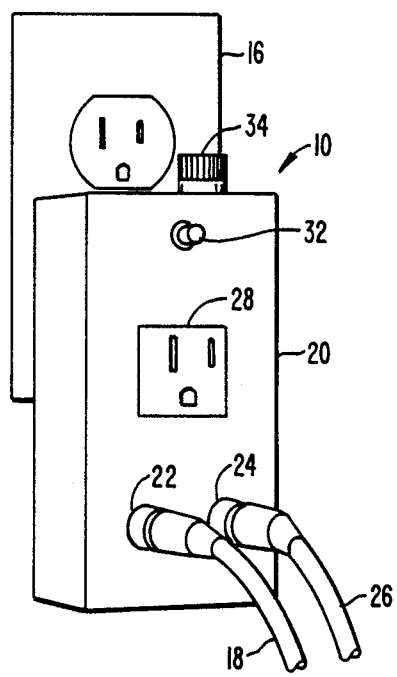
FIG._1.
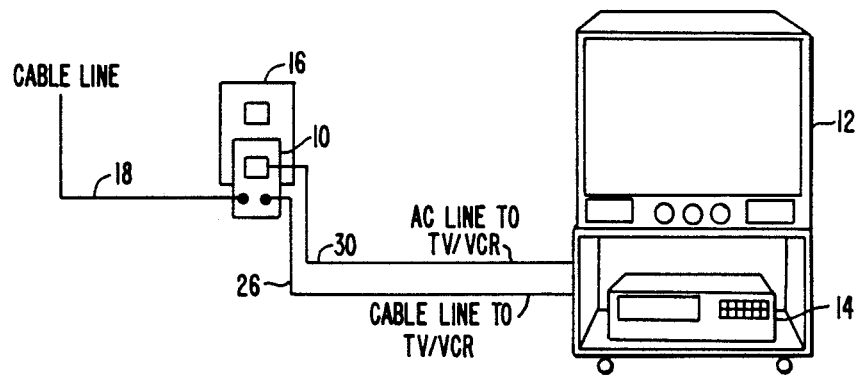
FIG._2.

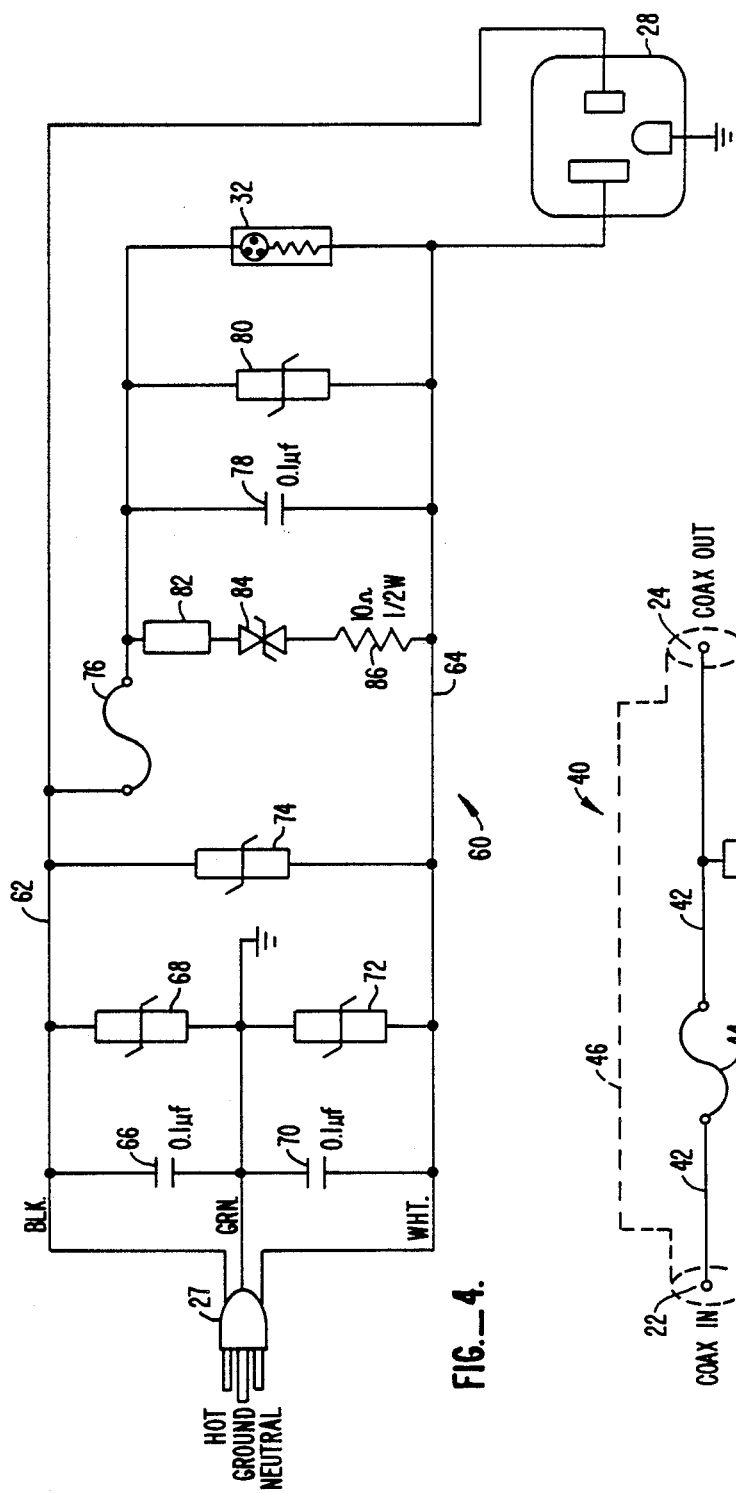
FIG._4.
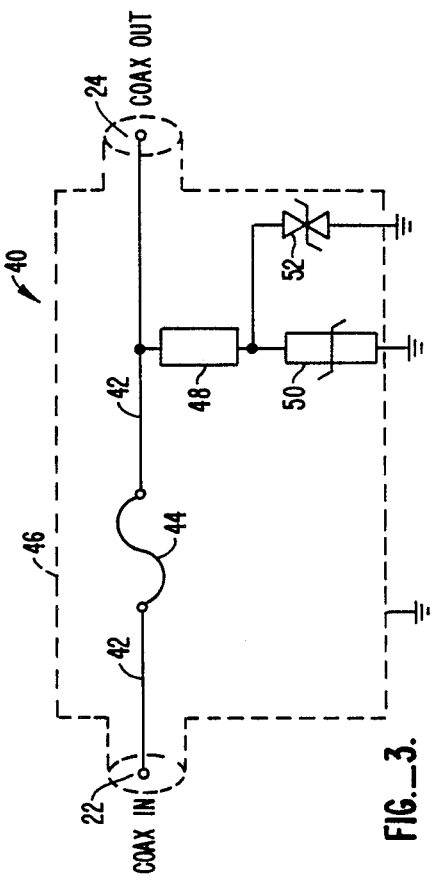
FIG._3.

SURGE SUPPRESSOR FOR COAX CABLE AND AC POWER LINES

BACKGROUND OF THE INVENTION

1. Field of the Invention

This invention relates generally to signal conditioning apparatus, and relates more particularly to an apparatus for conditioning both the AC power and the coaxial antenna lines commonly attached to audio and video entertainment equipment.

2. Description of the Relevant Art

Generally speaking, electronic equipment is vulnerable to damage from high voltage surges and transients caused by lightning, discharge of static electricity, switching, or other sources. Since the AC (alternating current) power line is an obvious path for the introduction of voltage surges into electronic equipment, AC power conditioning devices have been constructed that suppress unwanted voltage transients and surges present in AC power lines.

An AC power line, however, is not the only path through which a high voltage surge can enter and damage electronic equipment. Certain electronic entertainment equipment, such as televisions and video cassette recorders, are vulnerable to high voltage surges occurring on their antenna input lines, including the coaxial antenna lines commonly found in cable television distribution systems. For such equipment, AC power conditioning devices provide only incomplete protection against damaging voltage surges. Even equipment protected by an AC power conditioning device can be damaged by a high voltage surge occurring on the AC power line if the antenna line is in close proximity to the power line and the voltage surge is strong enough to jump to the antenna line.

SUMMARY OF THE INVENTION

In accordance with the illustrated preferred embodiment, the present invention provides a voltage surge suppressing apparatus for connecting electronic entertainment equipment to AC power and coaxial antenna lines. The surge suppressing apparatus comprises a housing and two surge suppression circuits, one for the coaxial antenna line and the other for the AC power line. A first surge suppression circuit is mounted within the housing and is adapted for connection in series between the coaxial antenna source line and the antenna input connector of the equipment. The first surge suppression circuit is operable for suppressing unwanted voltage transients and surges occurring in the coaxial antenna source line, and includes an input terminal adapted for connection to the coaxial antenna source line, an output terminal adapted for connection to the antenna input connector of the equipment, a conductive path disposed between the input and output terminals, a ferrite bead coupled at a first end thereof to the conductive path, and a varistor and a diode coupled in parallel between a second end of the ferrite bead and ground. A second surge suppression circuit is also mounted within the housing and is adapted for connection in series between the AC power line and the power plug of the equipment. The second surge suppression circuit is operable for suppressing unwanted voltage transients and surges occurring in the AC power line.

The present invention features voltage surge protection circuitry for both AC power and coaxial antenna lines in a single package. An important advantage of the present invention is that it provides comprehensive protection for electronic entertainment equipment, such as televisions and video cassette recorders, without undue degradation of the antenna signal.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a perspective view of a surge suppressor according to the present invention, as installed in an AC power receptacle.

FIG. 2 is a diagram of the surge suppressor of FIG. 1 as installed between home entertainment equipment and its associated AC power and coaxial antenna signal lines.

FIG. 3 is a schematic diagram of a coaxial antenna surge suppression circuit, according to the present invention.

FIG. 4 is a schematic diagram of an AC power surge suppression circuit, according to the present invention.

DETAILED DESCRIPTION OF THE PREFERRED

FIGS. 1 through 4 of the drawings depict the preferred embodiment of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a voltage surge suppressing apparatus useful for connecting electronic entertainment equipment to AC power and coaxial antenna lines. As shown in FIGS. 1 and 2, a voltage surge suppressor 10 constructed according to the principles outlined below, is connected in series between entertainment equipment, such as a television 12 or a video cassette recorder 14, and an AC power receptacle 16 and an antenna source line 18. The surge suppressor 10 includes a housing 20 within which two surge suppression circuits, one for AC power and the other for the antenna line, are packaged.

Two coaxial cable connectors 22 and 24 are provided in the front face of the housing 20, coaxial connector 22 for connection to the antenna source line 18 and coaxial connector 24 for connection to the antenna input connector of the entertainment equipment via a connecting cable 26. The antenna surge suppression circuit, as described below in conjunction with FIG. 3, is coupled between connectors 22 and 24.

An AC power input plug 27 (shown in FIG. 4) and an AC power outlet receptacle 28 provide the means for connecting the surge suppressor 10 in series between the AC power receptacle 16 and an AC power cord 30 of the entertainment equipment. The AC power input plug 27 of the surge suppressor 10 projects from the back face of the housing 20 and can be plugged directly into an AC receptacle 16, so that the surge suppressor is suspended from the front of the receptacle 16. The AC power outlet receptacle 28 of the surge suppressor 10 is mounted in the front face of the housing, thus providing access for the power cord 30 for the entertainment equipment. The AC power surge suppression circuit, as described below in conjunction with FIG. 4, is coupled between the AC power input plug 27 and the AC power outlet receptacle 28. FIG. 1 also shows an indicator light 32 and a fuse holder 34 of the AC power surge suppression circuit.

In reference now to FIG. 3, an antenna surge suppression circuit 40 of the present invention is illustrated. Circuit 40 includes the coaxial connector 22 as an input terminal and the coaxial connector 24 as an output terminal. Each coaxial connector 22 and 24 includes a central signal terminal and an outer shield terminal. The two signal terminals are connected by a conductive path 42 and a series-connected fuse 44. The two shield terminals are connected to a metal shield 46 that surrounds the antenna surge suppression circuit 40 and is electrically connected to ground. A ferrite bead 48 is connected at one end thereof to the conductive path 42 at a point between the fuse 44 and the output coaxial connector 24. A varistor 50 and a diode 52 are connected in series between the other end of the ferrite bead 48 and ground. The varistor 50 is preferably a metal-oxide varistor, while the diode 52 is preferably a bidirectional silicon transient suppressor diode, both selected to break down at voltages in slightly in excess of the normal signal voltage range.

In normal operation, antenna signals pass through the antenna surge suppression circuit 40 without significant degradation, due to the isolation of the varistor 50 and the diode 52 from the conductive path 42 by the ferrite bead 48. When a voltage surge appears at the coaxial input terminal 22, the fuse 44 will blow if the current induced by the voltage surge is high enough. In order to protect the entertainment equipment prior to the fuse blowing, the varistor 50 and the diode 52 provide a signal path to ground. Both the varistor 50 and the diode 52 act effectively as back-to-back zener diodes, and will clamp the signal to a selected voltage above or below ground potential.

In reference now to FIG. 4, an AC power surge suppression circuit 60 of the present invention is illustrated. Circuit 60 includes the AC power input plug 27 as an input terminal and the AC power output receptacle 28 as an output terminal. Connected between the hot terminals of the plug 27 and receptacle 28 is a hot conductive path 62, while connected between the neutral terminals of the plug and receptacle is a neutral conductive path 64. The ground terminals of the plug 27 and receptacle 28 are both grounded. Circuit 60 provides circuitry between each of the three terminals (hot, neutral, and ground) for the suppression of unwanted voltage transients and surges therebetween.

Connected in series between ground and the hot conductive path 62 is a capacitor 66 and a varistor 68. Connected in series between ground and the neutral conductive path 64 is a capacitor 70 and a varistor 72. These capacitors and varistors neutralize unwanted voltage surges occurring between the hot or neutral terminals of the input plug 27 and ground.

The remainder of the AC power surge suppression circuit 60 consists of circuitry for suppressing unwanted voltage transients and surges between the hot and neutral terminals of the input plug 27. A varistor 74 is connected between the hot and neutral conductive paths 62 and 64, and a fuse 76 is connected at a first side thereof to the hot conductive path 62. Connected in parallel between a second side of the fuse 76 and the neutral conductive path 64 are a capacitor 78, a varistor 80, the neon indicator lamp 32, and a series-connected ferrite bead 82, diode 84, and resistor 86. The varistors 68, 72, 74, and 80 are preferably metal-oxide varistors, while the diode 84 is preferably a bidirectional silicon transient suppressor diode, all selected to break down at voltages in slightly in excess of the normal AC signal voltage range. Varistors of the type used in both the antenna and AC power surge suppression circuits 40 and 60 are available from Siemens Components Division of Iselin, N.J. Diodes of the type used in the antenna and AC power surge suppression circuits are available from General Semiconductor Industries, Inc. of Tempe, Ariz.

In normal operation, AC power signals pass through the AC power surge suppression circuit 60 unaffected by the surge suppression circuitry. In the case of an unwanted voltage surge, however, the excess voltage is suppressed.

From the above description, it will be apparent that the invention disclosed herein provides a novel and advantageous apparatus for suppressing voltage surges in coax antenna and AC power lines. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A surge suppressing apparatus for connecting an AC power line and a coaxial antenna source line to equipment having an AC power plug and an antenna input connector, said apparatus comprising:

a housing;

a first surge suppression circuit mounted within said housing and adapted for connection in series between the coaxial antenna source line and the antenna input connector of the equipment, said first surge suppression circuit being operable for suppressing unwanted voltage transients and surges occurring in the coaxial antenna source line, said first surge suppression circuit comprising an input terminal adapted for connection to the coaxial antenna source line, an output terminal adapted for connection to the antenna input connector of the equipment, a conductive path disposed between said input and output terminals, a ferrite bead coupled at a first end thereof to said conductive path, and a varistor and a diode coupled in parallel between a second end of said ferrite bead and ground; and a second surge suppression circuit mounted within said housing and adapted for connection in series between the AC power line and the power plug of the equipment, said second surge suppression circuit being operable for suppressing unwanted voltage transients and surges occurring in the AC power line.

2. A surge suppressing apparatus as recited in claim 1 wherein said input and output terminals of said first surge suppression circuit each include a signal terminal and a shield terminal, wherein said conductive path disposed between said input and output terminals is electrically coupled between the signal terminals of said input and output terminals, and wherein said first surge suppression circuit further comprises an electrical shield coupled to the shield terminals of said input and output terminals and to ground, wherein said electrical shield surrounds and encloses the remainder of said first surge suppression circuit.

3. A surge suppressing apparatus as recited in claim 1 wherein said varistor of said first surge suppression circuit comprises a metal-oxide varistor.

4. A surge suppressing apparatus as recited in claim 1 wherein said diode of said first surge suppression circuit comprises a bidirectional silicon transient suppressor diode.

5. A surge suppressing apparatus as recited in claim 1 wherein said first surge suppression circuit further comprising a fuse disposed in series with said conductive path and located between said input terminal and said ferrite bead.

6. A surge suppressing apparatus as recited in claim 1 wherein said second surge suppression circuit comprises an input plug attached to said housing and adapted for insertion into an AC power receptacle, an output receptacle attached to said housing and adapted for receiving a power plug of the equipment, and AC surge suppression circuitry disposed between said input plug and output receptacle and operable for suppressing unwanted voltage transients and surges occurring in the AC power line.

7. A surge suppressing apparatus as recited in claim 6 wherein said input plug is attached to one side of said housing and said output receptacle is attached to a opposite side of said housing.

8. A surge suppressing apparatus as recited in claim 6 wherein said input plug of said second surge suppression circuit has hot, neutral, and ground terminals, wherein said output receptacle of said second surge suppression circuit has hot, neutral, and ground terminals that are electrically connected via conductive paths to said hot, neutral, and ground terminals, respectively, of said input plug, and wherein said AC surge suppression circuitry includes means coupled between each pair of said hot, neutral, and ground conductive paths for suppressing unwanted voltage transients and surges therebetween.

9. A surge suppressing apparatus as recited in claim 8 wherein said means for suppressing unwanted voltage transients and surges between said each pair of hot, neutral, and ground conductive paths includes a first capacitor and first varistor connected in parallel between said hot and ground conductive paths, includes a second capacitor and second varistor connected in parallel between said neutral and ground conductive paths, and includes a third varistor connected between said hot and neutral conductive paths, includes a fuse connected at a first side thereof to said hot conductive path, includes a third capacitor connected between a second side of said fuse and said neutral conductive path, includes a fourth varistor connected between the second side of said fuse and said neutral conductive path, and includes a ferrite bead, a diode, and a resistor connected in series between the second side of said fuse and said neutral conductive path.

10. A surge suppressing apparatus as recited in claim 9 wherein said varistors comprise metal-oxide varistors and wherein said diodes comprise bidirectional silicon transient suppressor diodes.

11. An apparatus for suppressing unwanted voltage transients and surges occurring in an AC power line and a coaxial antenna source line, said apparatus being adapted for connection in series between AC power and coaxial antenna source lines and equipment requiring AC power and a coaxial antenna signal, said apparatus comprising:
a housing containing first and second surge suppression circuits;
a first surge suppression circuit operable for suppressing unwanted voltage transients and surges occurring in the coaxial antenna source line and comprising a signal input terminal attached to said housing and adapted for connection to a coaxial antenna source line, a signal output terminal attached to said housing and adapted for connection to an antenna input connector of equipment requiring a coaxial antenna signal, a conductive path disposed between said signal input and output terminals, a fuse disposed in series with said conductive path, a ferrite bead coupled at a first end thereof to said conductive path at a position between said fuse and said signal output terminal, a metal-oxide varistor and a bidirectional silicon transient suppressor diode coupled in parallel between a second end of said ferrite bead and ground, and shielding means coupled to ground for shielding the remainder of said first surge suppression circuit; and
a second surge suppression circuit adapted for connection in series between the AC power line and the power plug of said equipment, said second surge suppression circuit comprising an input plug attached to said housing and adapted for insertion into an AC power receptacle, an output receptacle attached to said housing and adapted for receiving a power plug of the equipment, and AC surge suppression circuitry disposed between said input plug and output receptacle and operable for suppressing unwanted voltage transients and surges occurring in the AC power line.

12. An apparatus for suppressing unwanted voltage transients and surges occurring in an AC power line and a coaxial antenna source line, said apparatus being adapted for connection in series between AC power and coaxial antenna source lines and equipment requiring AC power and a coaxial antenna signal, said apparatus comprising:
a housing containing first and second surge suppression circuits;
a first surge suppression circuit operable for suppressing unwanted voltage transients and surges occurring in the coaxial antenna source line and comprising a signal input terminal attached to said housing and adapted for connection to a coaxial antenna source line, a signal output terminal attached to said housing and adapted for connection to an antenna input connector of equipment requiring a coaxial antenna signal, a conductive path disposed between said signal input and output terminals, a fuse disposed in series with said conductive path, a ferrite bead coupled at a first end thereof to said conductive path at a position between said fuse and said signal output terminal, a metal-oxide varistor and a bidirectional silicon transient suppressor diode coupled in parallel between a second end of said ferrite bead and ground, and shielding means coupled to ground for shielding the remainder of said first surge suppression circuit; and a second surge suppression circuit operable for suppressing unwanted voltage transients and surges occurring in the AC power line and adapted for connection in series between the AC power line and a power plug of equipment requiring AC power, said second surge suppression circuit including an input plug attached to one side of said housing and adapted for insertion into an AC power receptacle, said input plug having hot, neutral, and ground terminals, said second surge suppression circuit further including an output receptacle attached to an opposite side of said housing and adapted for receiving a power plug of the equipment, said output receptacle having hot, neutral, and ground terminals, said second surge suppression circuit further including hot, neutral, and ground conductive paths disposed between and electrically connecting said hot, neutral, and ground terminals, respectively, of said input plug and said output receptacle, said second surge suppression circuit further including AC surge suppression circuitry disposed between said input plug and output receptacle, wherein said AC power surge suppression circuitry includes means coupled between each pair of said hot, neutral, and ground conductive paths for suppressing unwanted voltage transients and surges therebetween, wherein said means includes one or more metal-oxide varistors, bidirectional silicon transient suppressor diodes, and capacitors.

* * * * *